(12) United States Patent
Chen et al.

(10) Patent No.: US 8,253,862 B2
(45) Date of Patent: Aug. 28, 2012

(54) METHOD AND DEVICE FOR IMAGE SHARPNESS ADJUSTMENT

(75) Inventors: Yi-Fan Chen, Taichung (TW); Wei-Kuo Lee, Hsinchu County (TW)

(73) Assignee: MStar Semiconductor, Inc., Hsinchu (TW)

( * ) Notice: Subject to any disclaimer, the term of this patent is extended or adjusted under 35 U.S.C. 154(b) by 1022 days.

(21) Appl. No.: 12/191,368

(22) Filed: Aug. 14, 2008

(65) Prior Publication Data

US 2009/0051817 A1   Feb. 26, 2009

(30) Foreign Application Priority Data

Aug. 20, 2007 (TW) .............................. 96130669 A

(51) Int. Cl.
*H04N 5/21* (2006.01)
(52) U.S. Cl. .......................... 348/625; 348/627; 382/260
(58) Field of Classification Search .................. 348/625, 348/627, 606, 610, 597, 603, 604; 382/260, 382/263–266, 254
See application file for complete search history.

(56) References Cited

U.S. PATENT DOCUMENTS

| | | | | |
|---|---|---|---|---|
| 6,211,922 B1 * | 4/2001 | Jun | ............................ | 348/569 |
| 6,337,718 B1 * | 1/2002 | Kim | ............................ | 348/569 |
| 6,342,927 B1 * | 1/2002 | Kimoto et al. | ................ | 348/569 |
| 6,373,531 B1 * | 4/2002 | Hidaka et al. | ................ | 348/603 |
| 6,411,306 B1 * | 6/2002 | Miller et al. | .................. | 348/602 |
| 6,633,654 B2 * | 10/2003 | Hannigan et al. | ............. | 382/100 |
| 6,985,636 B1 * | 1/2006 | Semenchenko | ............... | 382/266 |
| 7,119,852 B1 * | 10/2006 | Vandeginste | .................. | 348/602 |
| 7,840,089 B2 * | 11/2010 | Ho | ............................... | 382/266 |

* cited by examiner

*Primary Examiner* — Annan Shang
(74) *Attorney, Agent, or Firm* — WPAT, PC; Justin King

(57) ABSTRACT

The present invention discloses a method and a device for image sharpness adjustment. The device comprises a color analyzer, a color sharpness setting unit, a computing circuit, and a luminance adjusting unit. The color analyzer is for analyzing an input color signal to generate a plurality of color flags. The color sharpness setting unit is for generating a plurality of first sharpness gains according to the plurality of the color flags. The computing circuit is for generating a second sharpness gain according to the plurality of the first sharpness gains and the input color signal. The luminance adjusting unit is for adjusting a luminance signal according to the second sharpness gain.

20 Claims, 4 Drawing Sheets

METHOD AND DEVICE FOR IMAGE SHARPNESS ADJUSTMENT

BACKGROUND OF THE INVENTION

1. Field of the Invention

The present invention generally relates to a method and a device for image sharpness adjustment and, more particularly, to a method and a device allowing independent adjustments on the sharpness of different colors.

2. Description of the Prior Art

For a digital color image, the image quality depends on whether the color image is colorfully vivid. In addition to color saturation, color sharpness is an important index on determining the vividness of color images. Therefore, adjusting the color sharpness has become a key technique as to improve the image quality of digital color images.

In the prior art, numerous methods and devices for image sharpness adjustment have been disclosed. However, in these disclosures, one is only restricted to adjusting the image sharpness as a whole, instead of independently adjusting the sharpness of a specific color as desired.

Therefore, there is need in providing a method and a device for image sharpness adjustment for overcoming the foregoing drawback of the prior art. The method and device for image sharpness adjustment according to the invention, by independently adjusting the sharpness gain of a single color of the color image, allow independent adjustments on the sharpness of different colors as desired, thereby elevating the color image quality.

SUMMARY OF THE INVENTION

Accordingly, it is the primary object of the present invention to provide a method allowing independent adjustments on the sharpness of different colors as desired by independently adjusting the sharpness gain of a single color of the color image.

It is another object of the present invention to provide a device for image sharpness adjustment allowing independent adjustments on the sharpness of different colors as desired by independently adjusting the sharpness gain of a single color of the color image.

In order to achieve the foregoing objects, the present invention provides a method for image sharpness adjustment. The method comprises steps of analyzing an input color signal to generate a plurality of color component signals; generating a plurality of color sharpness gains according to the plurality of the color component signals and a plurality of sharpness is setting values, wherein each of the sharpness setting values corresponds to a specific color; generating a sharpness gain according to the plurality of the color sharpness gains and the input color signal; and adjusting a luminance signal according to the sharpness gain.

The present invention further provides a device for image sharpness adjustment. The device comprises a color analyzer for analyzing an input color signal to generate a color classifying signal representative of the color of the input color signal; a color sharpness setting unit for generating a color sharpness gain according to the color classifying signal; and a luminance adjusting unit for adjusting a luminance signal according to the color sharpness gain.

In one embodiment of the present invention, the color analyzer is performed by a look-up table (LUT) circuit, and the color sharpness setting unit has a multiplexer for selecting one of a plurality of sharpness setting values responsive to the color classifying signal.

The present invention further provides a device for image sharpness adjustment. The device comprises a color analyzer for analyzing an input color signal to generate a plurality of color flags; a color sharpness setting unit for generating a plurality of first sharpness gains according to the plurality of the color flags; a computing circuit for generating a second sharpness gain according to the plurality of the first sharpness gains and the input color signal; and a luminance adjusting unit for adjusting a luminance signal according to the second sharpness gain.

In one embodiment of the present invention the color analyzer is performed by a look-up table (LUT) circuit, and the color sharpness setting unit has a multiplexer for selecting one of a plurality of sharpness setting is values responsive to each one of the plurality of the color flags.

In one embodiment of the present invention, the luminance adjusting unit comprises an edge detector, for generating a luminance edge value according to the luminance signal and the color sharpness gain; and a noise suppressing circuit, for suppressing noise on the luminance signal according to the luminance edge value and a threshold.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing a method and a device for image sharpness adjustment can be exemplified by the preferred embodiment as described hereinafter.

Figure 1:
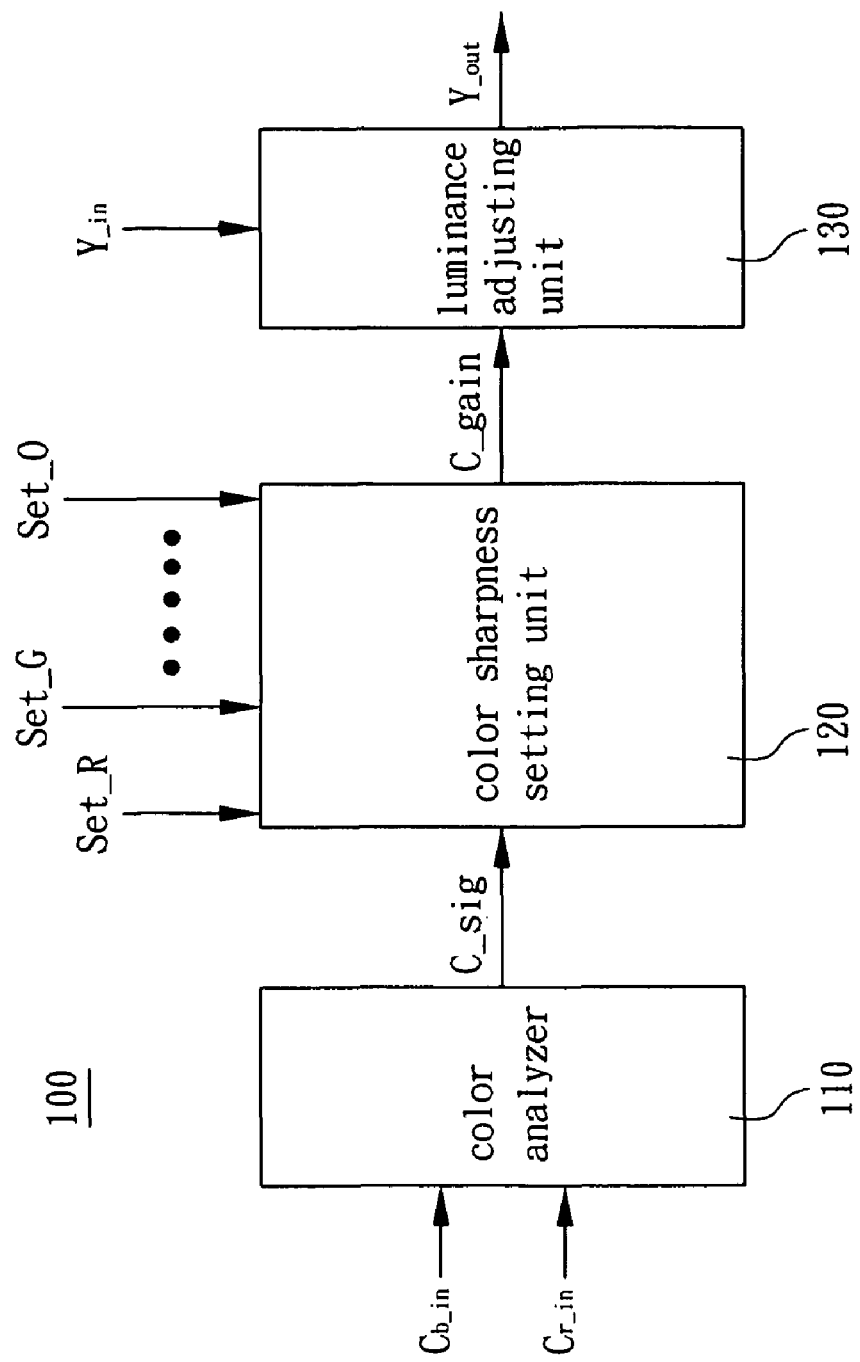
FIG. 1 is a schematic circuit diagram showing an image sharpness adjustment device in accordance with one embodiment of the present invention.

Please refer to FIG. 1, which is a schematic circuit diagram showing an image sharpness adjusting device in accordance with one embodiment of the present invention. In FIG. 1, the image sharpness adjusting device 100 comprises a color analyzer 110, a color sharpness setting unit 120, and a luminance adjusting unit 130. The color analyzer 110 is utilized to analyze an input color signal (Cb_in, Cr_in) to determine the color of the input color signal. The color analyzer 110 generates a color classifying signal C_sig to represent the color of the input color signal. In practice, the color analyzer 110 can be performed by a look-up table (LUT) circuit, so that the color of the input color signal is determined by looking a predetermined look-up table.

The color sharpness setting unit 120 receives sharpness setting values Set_R~Set_O which can be set by a user. R, G . . . O represent red, green . . . and other colors, respectively. Each of the sharpness setting values Set_R~Set_O corresponds to a specific color. That means a user can independently set the sharpness values of different colors, respectively. The color sharpness setting 120 generates a color sharpness gain C_gain according to the color classifying signal and the sharpness setting values. For example but not limitation, the color sharpness setting 120 has a multiplexer for selecting one of the sharpness setting values responsive to the color classifying signal C_sig. Then, the luminance adjusting unit 130 receives a luminance signal Y_in and the color sharpness gain C_gain, and adjusts the luminance signal based on the color sharpness gain C_gain so as to output a output luminance signal Y_out.

Figure 2:
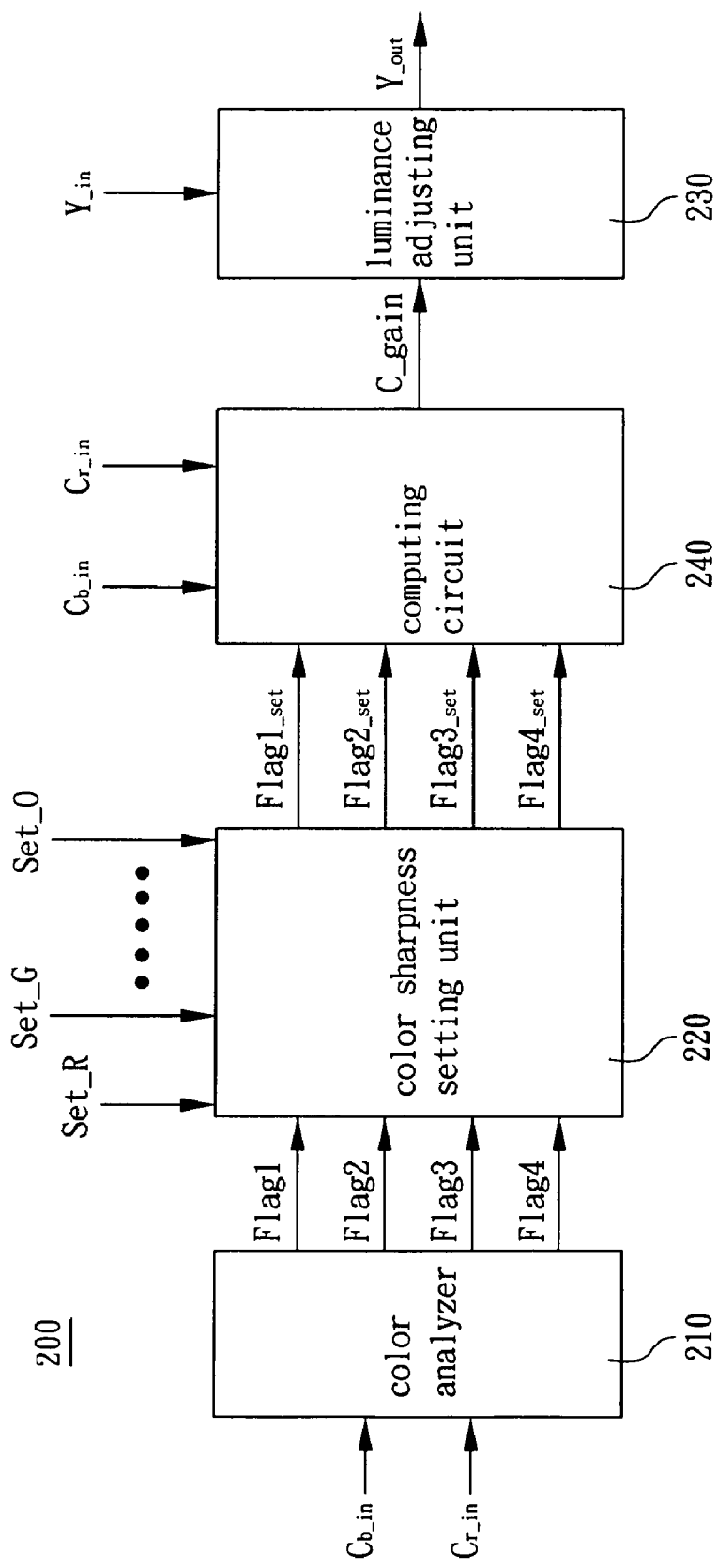
FIG. 2 is a schematic circuit diagram showing an image sharpness adjustment device in accordance with another embodiment of the present invention.

Please refer to FIG. 2, which is a schematic circuit diagram showing an image sharpness adjusting device in accordance with another embodiment of is the present invention. In FIG. 2, the image sharpness adjusting device 200 comprises a color analyzer 210, a color sharpness setting unit 220, a computing circuit 240, and a luminance adjusting unit 230. The color analyzer 210 is utilized to analyze the input color signal (Cb_in, Cr_in) to determine the color components of the input color signal. The color analyzer 210 is performed by a LUT circuit, for example, and generates a set of color flags Flag1~Flag4 according to the input color signal (Cb_in, Cr_in). The color flags represent the color components of the input color signal. In an exemplifying case, the input color signal is an 8-bit color signal. A look-up table corresponding to the 8-bit color signal requires a relatively large memory capacity. Therefore, the look-up table in the LUT circuit can be designed to use the four most significant bits (MSBs) of the 8-bit color signal so that the look-up table can reduce the memory capacity of the LUT circuit for lowered cost.

The color sharpness setting unit 220 receives sharpness setting values Set_R~Set_O which can be set by a user. Each of the sharpness setting values corresponds to a specific color. For example, the sharpness setting value Set_R represents the sharpness setting value for red. That is, the sharpness of red is adjusted when a user adjusts the value of the Set_R. For example but not limitation, the color sharpness setting unit 220 has a multiplexer. The color sharpness setting unit 220 selects one of the sharpness setting values Set_R~Set_O for each of the color flags Flag1~Flag4 based on the color represented by the color flag, and generates a color sharpness gain accordingly. That is, the color sharpness setting unit 220 generates a set of color sharpness gains Flag1_set~Flag4_set according to the color flags Flag1~Flag4 and the sharpness setting values Set_R~Set_O.

The computing circuit 240 is coupled to the color sharpness setting unit is 220, and performs a an interpolation operation according to the color sharpness gains Flag1_set~Flag4_set and the input color signal (Cb_in, Cr_in) so as to generate a sharpness gain C_gain. For example but not limitation, the interpolation operation is based on the color sharpness gains Flag1_set~Flag4_set and the least significant bits (LSBs) of the input color signal (Cb_in, Cr_in). In one embodiment, the interpolation operation is a bi-linear interpolation operation.

Figure 3:
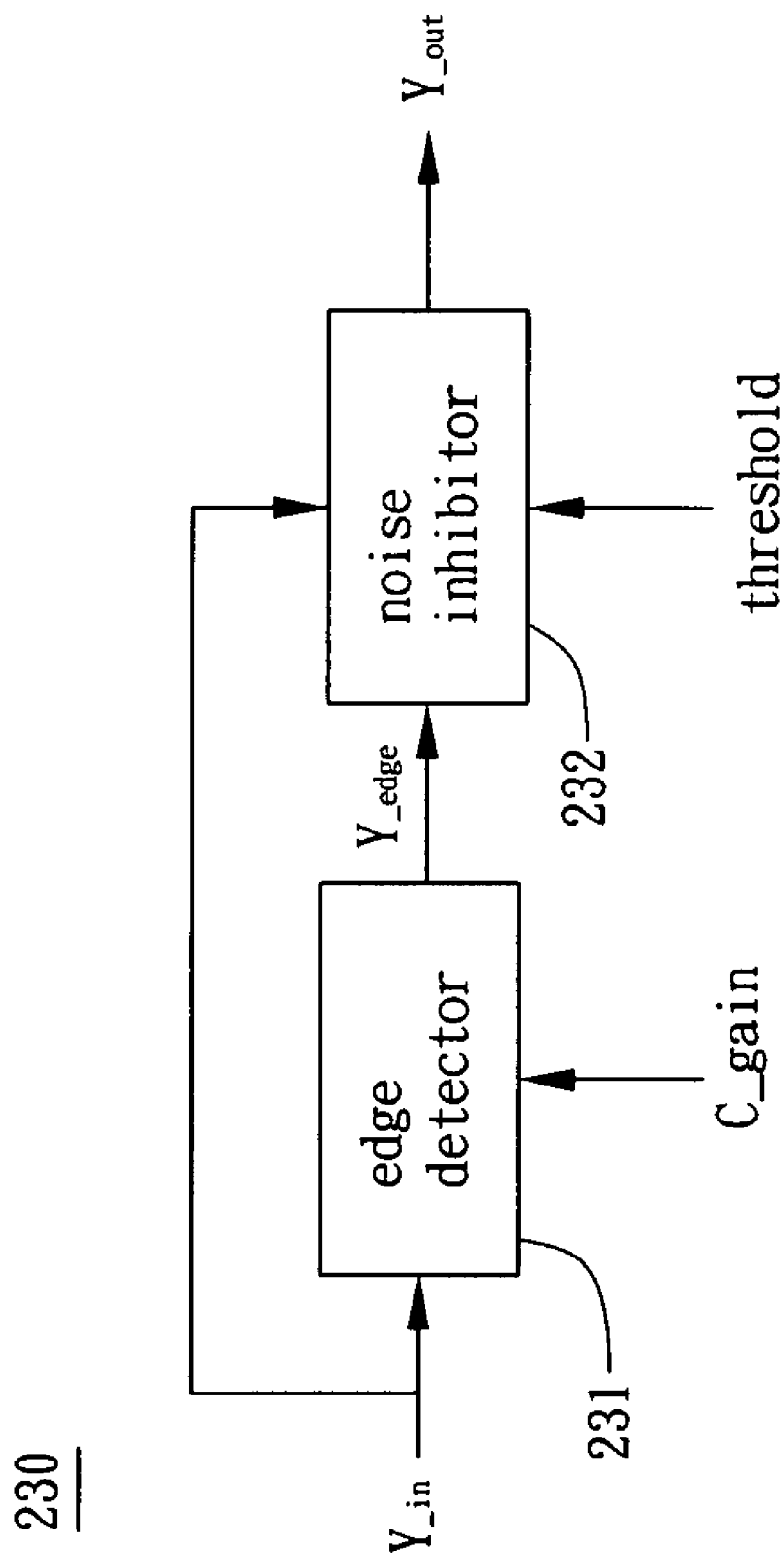
FIG. 3 is a schematic circuit diagram showing a luminance adjusting unit in an image sharpness adjustment device in accordance with one embodiment of the present invention.

The luminance adjusting unit 230 adjusts a luminance signal Y_in according to the sharpness gain C_gain. Please refer to FIG. 3, which is a schematic circuit diagram showing a luminance adjusting unit in an image sharpness adjustment device in accordance with one embodiment of the present invention. The luminance adjusting unit 230 comprises an edge detector 231 and a noise suppressing circuit 232. The edge detector 231 receives the luminance signal Y_in to generate a luminance edge value Y_edge according to the sharpness gain C_gain. The noise suppressing circuit 232 suppresses the noise on the luminance signal Y_in to generate an output luminance signal Y_out according to the luminance edge value Y_edge and a predetermined threshold. More particularly, the output luminance signal Y_out is the luminance signal Y_in if the luminance edge value Y_edge is not larger than the threshold; otherwise, the output luminance signal Y_out is the luminance signal Y_in plus the difference between the luminance edge value Y_edge and the threshold if the luminance edge value Y_edge is larger than the threshold. In one embodiment, the edge detector 231 comprises a high-pass filter and the noise suppressing circuit 232 comprises an adder.

Figure 4:
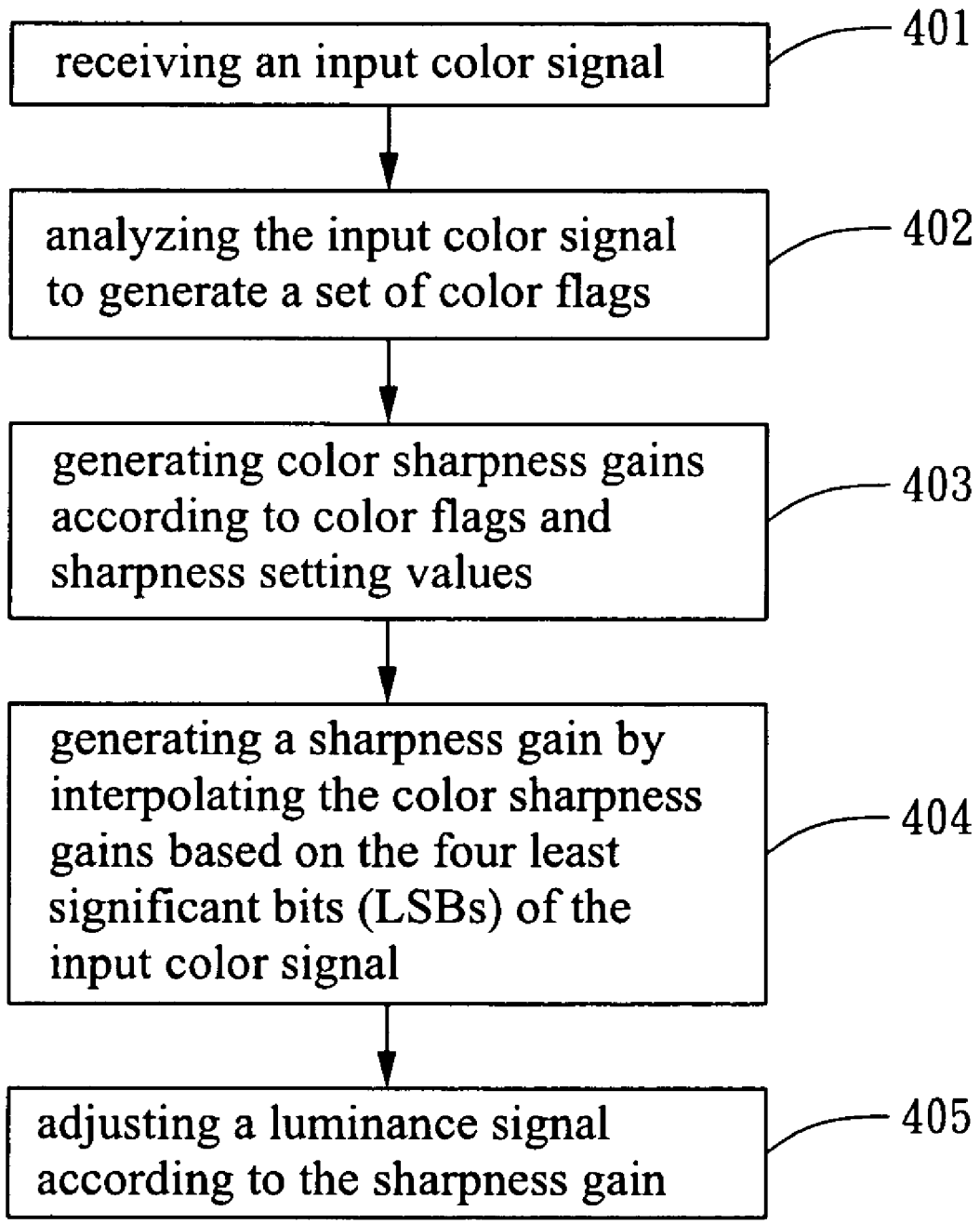
FIG. 4 is a flow chart showing an image sharpness adjustment method in accordance with one embodiment the present invention.

Please refer to FIG. 4, which is a flow chart showing an image sharpness adjustment method in accordance with one embodiment of the present invention. The image sharpness adjustment method comprises steps described hereinafter:

To begin with, in Step 401, an input color signal is received.

In Step 402, analyzes the input color signal to generate a set of color flags. The color flags represent the color components of the input color signal. For example but not limitation, the input color signal is analyzed by looking a look-up table so as to get the color flags. In an exemplifying case, taking an 8-bit color signal for example, the look-up table can be designed to use the four most significant bits (MSBs) of the input color signal so that to reduce the memory capacity for lowered cost.

Then, in Step 403, generates color sharpness gains according to the color flags and a plurality of sharpness setting values. Each of the sharpness setting values corresponds to a specific color. The sharpness setting values can be set independently by a user.

In Step 404, a sharpness gain is generated by interpolating the color sharpness gains based on the four least significant bits (LSBs) of the input color signal.

At last, in Step 405, a luminance signal is adjusted according to the sharpness gain. The step of adjusting the luminance signal comprises steps of generating a luminance edge value according to the luminance signal and the sharpness gain; and suppressing the noise on the luminance signal to generate an output luminance signal according to the luminance edge value and a predetermined threshold. More particularly, the output luminance signal is the luminance signal if the luminance edge value is not larger than the threshold; otherwise, the output luminance signal is the luminance signal plus the is difference between the luminance edge value and the threshold if the luminance edge value is larger than the threshold.

According to the above discussion, the present invention discloses a method and a device for image sharpness adjustment allowing independent adjustments on the sharpness of different colors as desired by independently adjusting the sharpness gain of a single color of the color image so as to improve the color image quality. Therefore, the present invention has been examined to be progressive, advantageous and applicable to the industry.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

What is claimed is:

1. A device for image sharpness adjustment, comprising:
a color analyzer, for analyzing an input color signal to generate a color classifying signal representative of the color of the input color signal;
a color sharpness setting unit, for generating a color sharpness gain according to the color classifying signal; and
a luminance adjusting unit, for adjusting a luminance signal according to the color sharpness gain.

2. The device as recited in claim 1, wherein the color analyzer is performed by a look-up table (LUT) circuit.

3. The device as recited in claim 1, wherein the color sharpness setting unit has a multiplexer for selecting one of a plurality of sharpness setting values responsive to the color classifying signal.

4. The device as recited in claim 1, wherein the luminance adjusting unit comprises:
- an edge detector, for generating a luminance edge value according to the luminance signal and the color sharpness gain; and
- a noise suppressing circuit, for suppressing noise on the luminance signal according to the luminance edge value and a threshold.

5. The device as recited in claim 4, wherein the edge detector is performed by a high-pass filter.

6. The device as recited in claim 4, wherein when the luminance edge value is not larger than the threshold, the luminance adjusting unit outputs the luminance signal as an output luminance signal; when the luminance edge value is larger than the threshold, the luminance adjusting unit outputs the output luminance signal which is the luminance signal plus a difference between the luminance edge value and the threshold.

7. A device for image sharpness adjustment, comprising:
- a color analyzer, for analyzing an input color signal to generate a plurality of color flags;
- a color sharpness setting unit, for generating a plurality of first sharpness gains according to the plurality of the color flags;
- a computing circuit, for generating a second sharpness gain according to the plurality of the first sharpness gains and the input color signal; and
- a luminance adjusting unit, for adjusting a luminance signal according to the second sharpness gain.

8. The device as recited in claim 7, wherein the color analyzer is performed by a look-up table (LUT) circuit.

9. The device as recited in claim 6, wherein the color sharpness setting unit has a multiplexer for selecting one of a plurality of sharpness setting values responsive to each one of the plurality of the color flags.

10. The device as recited in claim 7, wherein the plurality of color flags is generated by using most significant bits (MSBs) of the input color signal.

11. The device as recited in claim 10, wherein the second sharpness gain is generated by interpolating the plurality of the first sharpness gains based on least significant bits (LSBs) of the input color signal.

12. The device as recited in claim 7, the luminance adjusting unit comprises:
- an edge detector, for generating a luminance edge value according to the luminance signal and the second sharpness gain; and
- a noise suppressing circuit, for suppressing noise on the luminance signal according to the luminance edge value and a threshold.

13. The device as recited in claim 12, wherein the edge detector is performed by a high-pass filter.

14. The device as recited in claim 12, wherein when the luminance edge value is not larger than the threshold, the luminance adjusting unit outputs the luminance signal as an output luminance signal; when the luminance edge value is larger than the threshold, the luminance adjusting unit outputs the output luminance signal which is the luminance signal plus a difference between the luminance edge value and the threshold.

15. A method for image sharpness adjustment performed by an electronic device, comprising steps of:
- analyzing an input color signal to generate a plurality of color flags;
- generating a plurality of first sharpness gains according to the plurality of the color flags;
- generating a second sharpness gain according to the plurality of the first sharpness gains and the input color signal; and
- adjusting a luminance signal according to the second sharpness gain.

16. The method as recited in claim 15, wherein the plurality of color flags is generated by looking a look-up table (LUT).

17. The method as recited in claim 15, wherein the plurality of color flags is generated by using most significant bits (MSBs) of the input color signal.

18. The method as recited in claim 17, wherein the second sharpness gain is generated by interpolating the plurality of the first sharpness gains based on least significant bits (LSBs) of the input color signal.

19. The method as recited in claim 15, wherein the step of adjusting the luminance signal comprises steps of:
- generating a luminance edge value according to the luminance signal and the second sharpness gain; and
- suppressing noise on the luminance signal according to the luminance edge value and a threshold.

20. The method as recited in claim 19, wherein the step of adjusting the luminance signal generates an output luminance signal which is the luminance signal plus a difference between the luminance edge value and the threshold.

* * * * *